Patented Dec. 2, 1924.

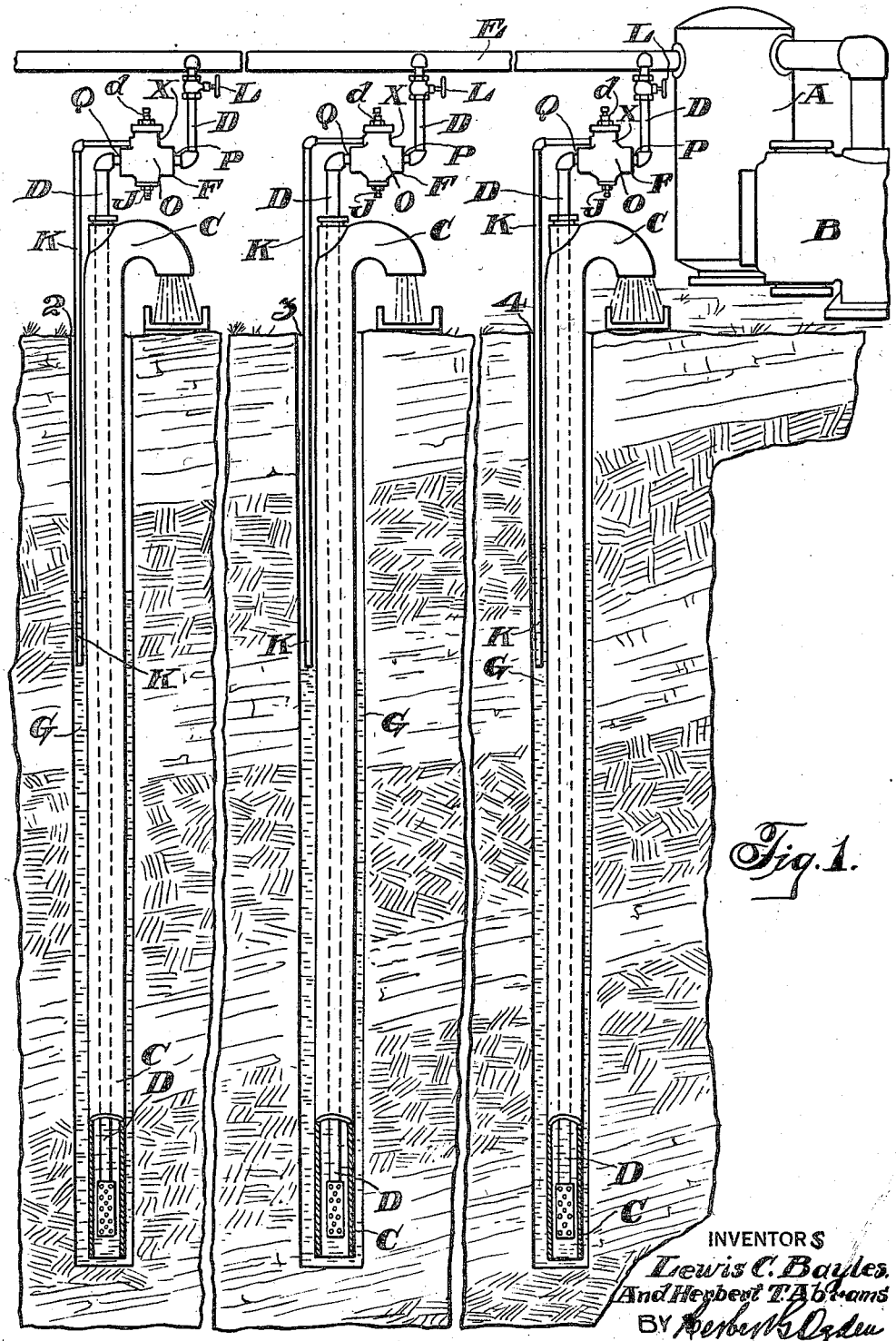

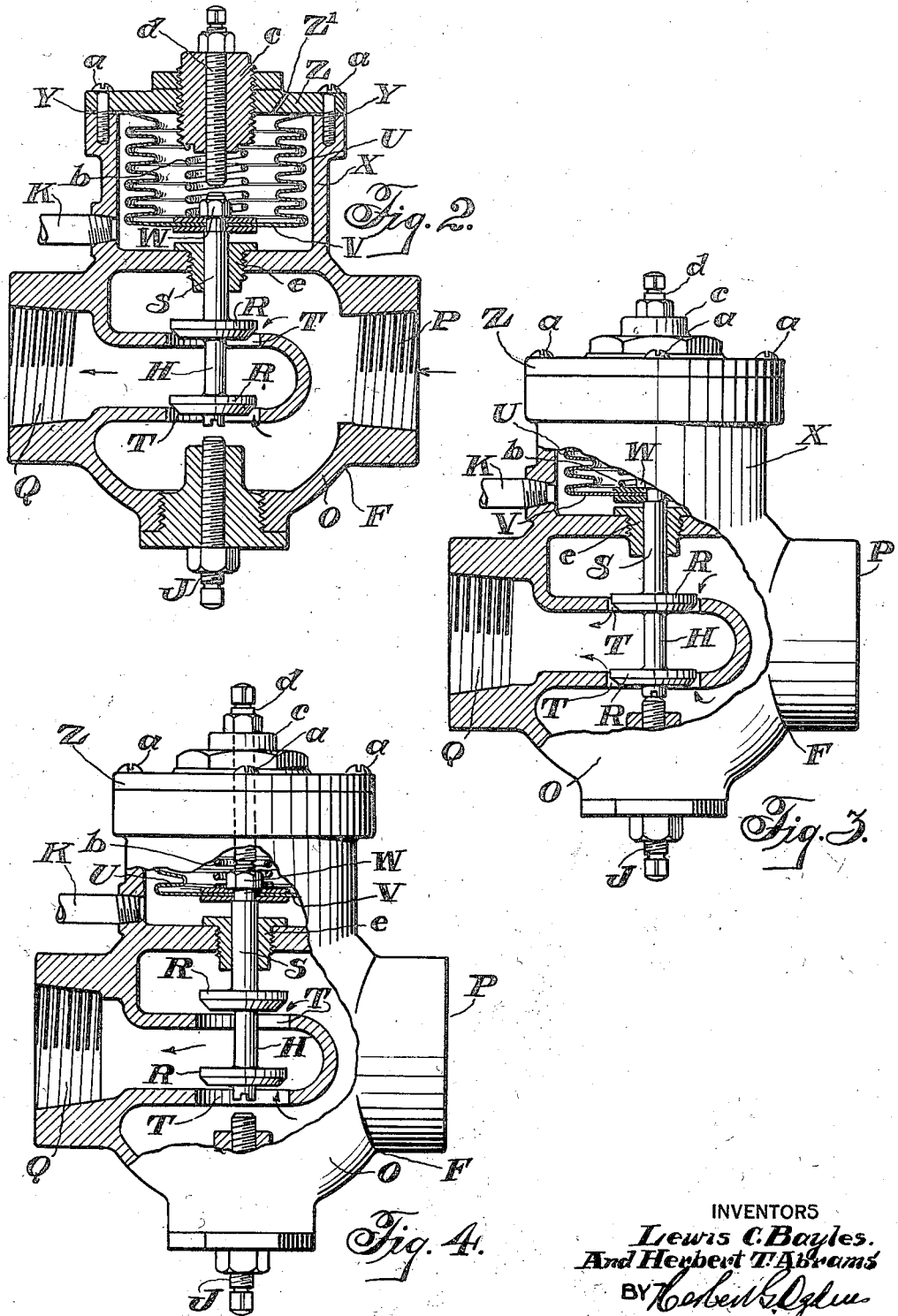

1,517,490

UNITED STATES PATENT OFFICE.

LEWIS C. BAYLES, OF EASTON, PENNSYLVANIA, AND HERBERT T. ABRAMS, OF ORANGE, NEW JERSEY, ASSIGNORS TO INGERSOLL-RAND COMPANY, OF JERSEY CITY, NEW JERSEY, A CORPORATION OF NEW JERSEY.

REGULATOR FOR AIR-LIFT PUMPS.

Application filed February 24, 1923. Serial No. 620,900.

*To all whom it may concern:*

Be it known that we, LEWIS C. BAYLES, a citizen of the United States, a resident of Easton, county of Northampton, and State of Pennsylvania, and HERBERT T. ABRAMS, a citizen of the United States, and a resident of Orange, county of Essex, and State of New Jersey, have invented a certain Regulator for Air-Lift Pumps, of which the following is a specification accompanied by drawings.

This invention relates to air lift pumps, but more particularly to automatic regulation for such pumps, by means of apparatus adapted to be inserted in the fluid pressure supply pipe of the pump at a convenient point, preferably above ground, for regulating the fluid pressure supply and thereby the output of the pump in accordance with changes in the level of the fluid in the well being pumped.

Such automatic regulation is especially useful with a series of pumps which are supplied at the same pressure from a single source of fluid pressure, as for instance an air compressor, because in that case, a well in which the level has fallen lower than in the others, will take an unduly large amount of air, thus seriously affecting the economy of that particular pump and depriving the remaining units of sufficient air for efficient operation. The application of our regulating system to the pump prevents this uneconomic operation.

The objects of the invention are to improve upon automatic regulating means of this type, make the regulation more sensitive and positive in operation and responsive to comparatively small changes in regulating pressure, which are produced in this case by the varying height of the level of the liquid in the well being pumped. As the well fills up and the level rises, more air is required, and vice versa, but our apparatus operates substantially in accordance with such changes, and we accomplish this regulation preferably by means of a sensitive fluid pressure responsive device, operatively connected to a valve and preferably connected to a regulator pipe, extending down into the well a sufficient distance to enable the lower end of the regulator pipe to be submerged when the liquid in the well reaches a certain pre-determined height.

In order to make the apparatus extremely sensitive, constant leakage of fluid is permitted under pressure to said fluid pressure responsive device and down the regulator pipe, so that the liquid in the well is prevented from rising in the regulator pipe itself and the benefit of the full head of pressure, due to the rise in the level of the liquid in the well, around the regulator pipe, is obtained and is available for regulating purposes.

Further objects of the invention will hereinafter appear, and to all of these ends the invention consists of the features of construction, arrangement of parts, and combinations of elements substantially as hereinafter fully described and claimed in this specification, and shown in the accompanying drawings, in which—

Figure 1 is a diagrammatic view partly in vertical section of a series of wells having our automatic regulation applied to each well.

Figure 2 is an enlarged detail sectional elevation showing the construction of the valve with the valve partly open.

Figure 3 is a similar view with the valve closed to its fullest extent and resting upon the adjustable stop for maintaining the valve partly open at all times, and Figure 4 is a similar view with the valve fully open.

Referring to the drawings, Figure 1 illustrates a series of wells 2, 3 and 4, each having an air lift pump operated with compressed air from a receiver A to which a compressor B is connected. The eduction pipes C of the pumps extend to points near the bottoms of the wells, and fluid pressure supply pipes D extend to the lower submerged ends within the eduction pipes and are connected to the source of supply of fluid under pressure by the common supply pipe E. An automatic regulator F is inserted in each fluid pressure supply pipe D at a convenient point, as shown, preferably above ground, for regulating the fluid pressure supply in accordance with changes in the level of liquid G in the well being pumped.

In Figure 1 the position of the valve in each regulator F for the wells 2, 3 and 4, is assumed to correspond with the position of the valve H in each of the Figures 2, 3 and 4, for convenience of illustration. As shown in Figure 2, the valve of the regulator for well 2 is more fully open than normal and the level of the liquid G in said well is at a point intermediate the levels of the liquid in the wells 3 and 4. In Figure 3, the regulator valve H is shown in normal partially closed position resting upon the adjustable stop J and has been closed as far as the stop will permit closing, so that some air is still being passed down the supply pipe. The liquid level in well 3 has fallen to a point at or below the lower end of the regulator pipe K, so that there is substantially no pressure in said pipe. Figure 4 shows the regulator valve H fully open, and the liquid level in well 3 is at substantially the highest point at which the maximum amount of air is required for the well. Throttle valves L may be provided for each pump, in the supply pipes B, as is customary. It is to be understood that the valve H of the regulator is constantly open and never fully closed, so that some air is always passing into the pipe D.

Referring more particularly to the construction of the regulator illustrated in detail in Figures 2, 3 and 4, the regulator comprises a valve casing O, to which the fluid pressure supply pipe D and the source of supply, may be connected at the inlet opening P. The opening Q in the valve casing is connected to that portion of the pipe D leading into the eduction pipe C of the well although the function of these openings P and Q may be reversed if desired and the opening Q may become the inlet to the valve casing, while the opening P becomes the outlet. The valve H in the casing may be of any suitable form, preferably of the duplex construction shown having two valve discs R on a single stem S, as this construction has been found to operate satisfactorily and well. The valve controls a port or ports T leading to the air supply pipe so that the quantity of air passing to a well is regulated in accordance with the requirements.

A fluid pressure responsive device, preferably in the form of a sylphon or corrugated collapsible metallic diaphragm U of general cylindrical shape, is connected to the valve stem S to actuate said valve and in this instance, the head V of the diaphragm is connected to the stem S as by means of the nut W. The diaphragm is located within a regulator chamber formed by the casing walls X and the edge or lip Y of the diaphragm is secured between the casing walls X and the cover or cap Z as by means of the screws $a$. The cover Z is provided with the vent Z', for venting the inside of the sylphon but not the regulator chamber. The only vent from the regulator chamber is through the regulator pipe K until said pipe is sealed by the rising liquid in the well.

The upward or opening movement of the valve H and the collapsing movement of the diaphragm is opposed by a suitable force which may be exerted by a coiled spring $b$ held in position within the diaphragm by means of a screw threaded plug $c$ having an adjustable stop $d$ therein against which the valve spindle S may impinge in order to limit the opening movement of the valve.

The regulator chamber formed within the casing walls X is connected to the regulator pipe K which extends downwardly into the well a sufficient distance to enable its lower end to be submerged to a greater or less extent, depending upon the level of the fluid in the well, as indicated in Figure 1. The rise and fall of fluid in the well around the submerged end of the regulator pipe K tends to create variations or fluctuations of pressure in the pipe which are utilized for regulating purposes. In order that a small rise in the level of the water or fluid in a well around the submerged end of the regulator pipe K may create sufficient pressure to actuate or collapse the diaphragm U, constant leakage of fluid under full line pressure is permitted from the valve casing O directly to the chamber within the casing walls X, in which the diaphragm U is located and while the provision for leakage may be accomplished in several ways, sufficient leakage may be provided between the valve stem S and the bore of the threaded valve stem bushing $e$ in which the stem moves. Although the clearance between the valve stem S and the bushing $e$ is too small to be shown in the drawings, it is to be understood that this clearance amounts to a few thousandths of an inch. By eliminating a stuffing box at this point, and providing the clearance, the desired leakage takes place and the friction is reduced to a minimum, thus making the device more sensitive. The air leaking into the chamber within the casing walls X may pass to atmosphere through the regulator pipe K if the lower end of the said pipe is open as indicated in the diagram of the well 3 of Figure 1. When the liquid in the well rises above the lower end of the regulator pipe, the leakage of air will prevent the liquid from rising within the pipe depending upon the height of the liquid level. The pressure thus transmitted to the diaphragm U will tend to collapse the diaphragm to a given extent and more fully open the valve H to a certain degree, and supply the required quantity of air to the pump. By adjusting the tension of the opposing spring $b$ in the regulator, the pressure limits between which the regulator will act may be determined, so that the regulator pipe K may be of any indefinite length, extending down into the liquid in the well, and the regulator may be set to act as the level of the liquid in the well rises beyond a pre-determined point.

We do not herein claim the specific construction of the regulating valve itself, as claims for such construction form the subject matter of a separate application of Lewis C. Bayles, filed Feb. 10, 1923, Serial No. 618,237.

We claim:

1. In an air lift pump for wells, the combination of an eduction pipe extending into the well, a fluid pressure supply pipe extending to the lower submerged end of the eduction pipe, and an automatic regulator adapted to be inserted in the said fluid pressure supply pipe at a point above the ground, said regulator comprising a valve casing, a constantly open valve in said casing, a fluid tight regulator chamber, a fluid pressure responsive device in said chamber operatively connected to move said valve to more fully open position, opposing means exerting a force tending to move the valve to its normal partially closed position, and a regulator pipe connected at one end to supply pressure to said chamber and fluid pressure responsive device and extending down into the well a sufficient distance to enable the lower end of the pipe to be submerged to a greater or less extent, whereby variations of pressure for actuating the valve are created in the said regulator pipe and in the regulator chamber of the fluid pressure responsive device in accordance with changes of the level of the liquid in the well.

2. In an air lift pump for wells, the combination of an eduction pipe extending into the well, a fluid pressure supply pipe extending to the lower submerged end of the eduction pipe, and an automatic regulator adapted to be inserted in the said fluid pressure supply pipe at a point above ground, said regulator comprising a valve casing, a constantly open valve in said casing, a fluid tight regulator chamber, a fluid pressure responsive device in said chamber operatively connected to move said valve to more fully open position, opposing means exerting a force tending to move the valve to its normal partially closed position, a regulator pipe connected at one end to supply pressure to said chamber and fluid pressure responsive device and extending down into the well a sufficient distance to enable the lower end of the pipe to be submerged to a greater or less extent, and means for constantly permitting sufficient leakage of fluid under full line pressure directly to said fluid tight chamber and fluid pressure responsive device and to the said regulator pipe, whereby variations of pressure of sufficient strength for actuating the valve are insured in the said regulator pipe and in the regulator chamber of the fluid pressure responsive device in accordance with changes of the level of the liquid in the well.

3. In an air lift pump for wells, the combination of an eduction pipe extending into the well, a fluid pressure supply pipe extending to the lower submerged end of the eduction pipe, and an automatic regulator adapted to be inserted in the said fluid pressure supply pipe at a point above ground, said regulator comprising a valve casing, a constantly open valve in said casing, a fluid tight regulator chamber a collapsible diaphragm in said chamber operatively connected to move said valve to more fully open position, a spring exerting a force tending to move the valve to its normal partially closed position, and a regulator pipe connected at one end to supply pressure to said chamber and fluid pressure responsive device and extending down into the well a sufficient distance to enable the lower end of the pipe to be submerged to a greater or less extent, whereby variations of pressure for actuating the valve are created in the said regulator pipe and in the fluid tight chamber of the fluid pressure responsive device in accordance with changes of the level of the liquid in the well.

4. In an air lift pump for wells, the combination of an eduction pipe extending into the well, a fluid pressure supply pipe extending to the lower submerged end of the eduction pipe, and an automatic regulator adapted to be inserted in the said fluid pressure supply pipe at a point above the ground, said regulator comprising a valve casing, a constantly open valve in said casing, a fluid tight regulator chamber, a collapsible diaphragm in said chamber operatively connected to move said valve to more fully open position, a spring exerting a force tending to move the valve to its normal partially closed position, a regulator pipe connected at one end to supply pressure to said chamber and fluid pressure responsive device and extending down into the well a sufficient distance to enable the lower end of the pipe to be submerged to a greater or less extent, and means for constantly permitting sufficient leakage of fluid under full line pressure to said chamber and fluid pressure responsive device and to the said regulator pipe, whereby variations of pressure of sufficient strength for actuating the valve are insured in the said regulator pipe and in the fluid tight chamber of the fluid pressure responsive device in accordance with changes of the level of the liquid in the well.

5. In an air lift pump for wells, the combination of an eduction pipe extending into the well, a fluid pressure supply pipe extending to the lower submerged end of the eduction pipe, and an automatic regulator adapted to be inserted in the said fluid pressure supply pipe at a point above ground, said regulator comprising a valve casing, a constantly open valve in said casing, adjustable means for preventing said valve from completely closing, a fluid tight regulator chamber a fluid pressure responsive device in said chamber operatively connected to move said valve to more fully open position, adjustable opposed means exerting a force tending to move the valve to its normal partially closed position, and a regulator pipe connected at one end to supply pressure to said chamber and fluid pressure responsive device and extending down into the well a sufficient distance to enable the lower end of the pipe to be submerged to a greater or less extent, whereby variations in pressure for actuating the valve are created in the said regulator pipe and in the fluid tight chamber of the fluid pressure responsive device in accordance with changes of the level of the liquid in the well.

6. In an air lift pump for wells, the combination of an eduction pipe extending into the well, a fluid pressure supply pipe extending to the lower submerged end of the eduction pipe and adapted to be connected with a source of supply of fluid under pressure, an automatic regulator inserted in the said fluid pressure supply pipe at a point above ground for regulating the fluid pressure supply in accordance with changes in the level of the fluid in the well to be pumped, said regulator comprising a valve casing to which the fluid pressure supply pipe and the source of supply are connected, a constantly open valve in said valve casing adapted to control a port leading to the air supply pipe, a fluid tight regulator chamber, a normally open vent adapted to be sealed to atmosphere, a fluid pressure responsive device in said chamber connected to actuate said valve, means for constantly permitting sufficient leakage of fluid under full line pressure to said chamber and fluid pressure responsive device to build up pressure tending to more fully open the valve when the regulator pipe is sealed, a regulator pipe connected at its upper end to the vent of said chamber of said fluid pressure responsive device and extending down into the well a sufficient distance to enable its lower end to be submerged to a greater or less extent depending upon the level of the fluid in the well, and means for permitting the leakage of fluid under pressure to pass from the chamber of the pressure responsive device into said regulator pipe, whereby variations of pressure of sufficient strength for actuating the valve are insured in the said regulator pipe and in the chamber of the fluid pressure responsive device in accordance with the changes of the level of the liquid in the well.

In testimony whereof we have signed this specification.

LEWIS C. BAYLES.
HERBERT T. ABRAMS.